Mar. 6, 1923. 1,447,494.
T. STRAWN.
FRUIT DRYING APPARATUS.
FILED JAN. 14, 1922. 2 SHEETS—SHEET 1.
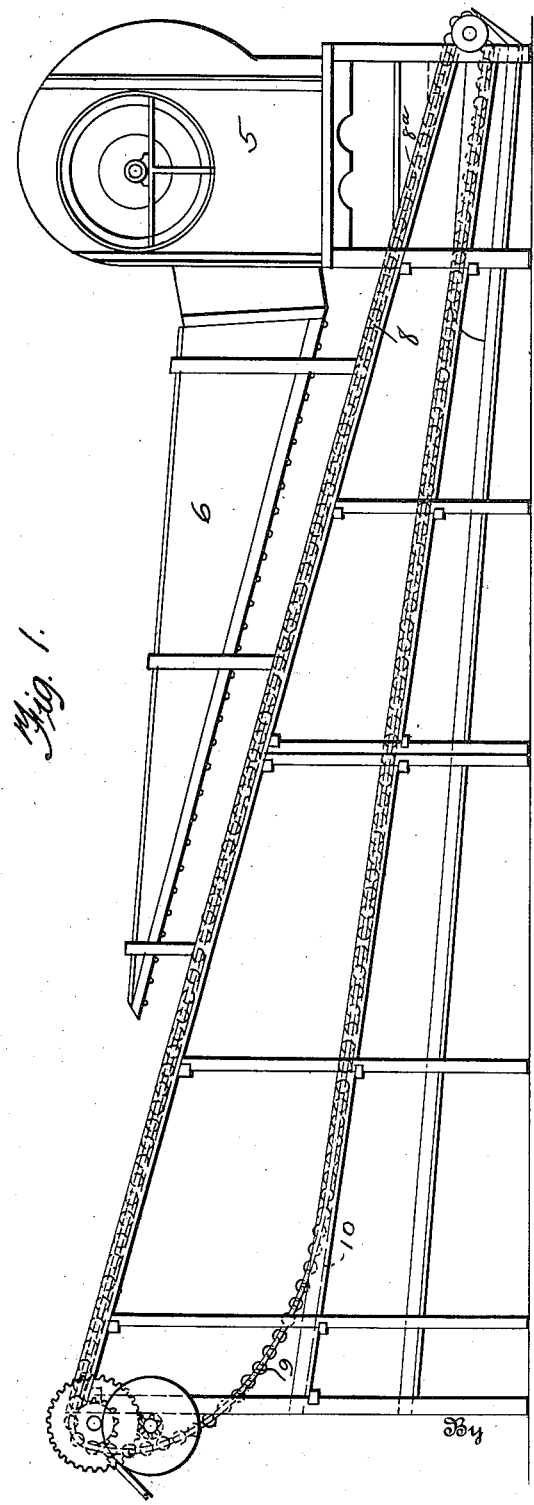
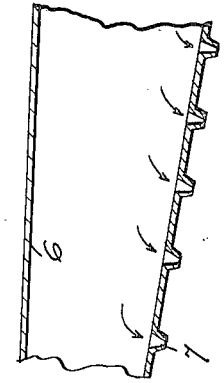
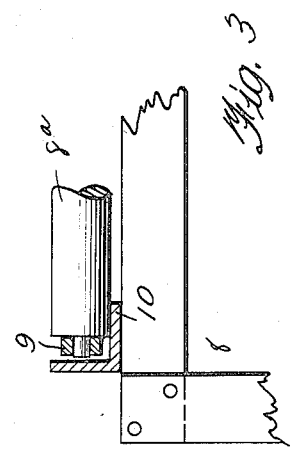
Inventor
Theodore Strawn,
By Samuel P Herrick,
Attorney

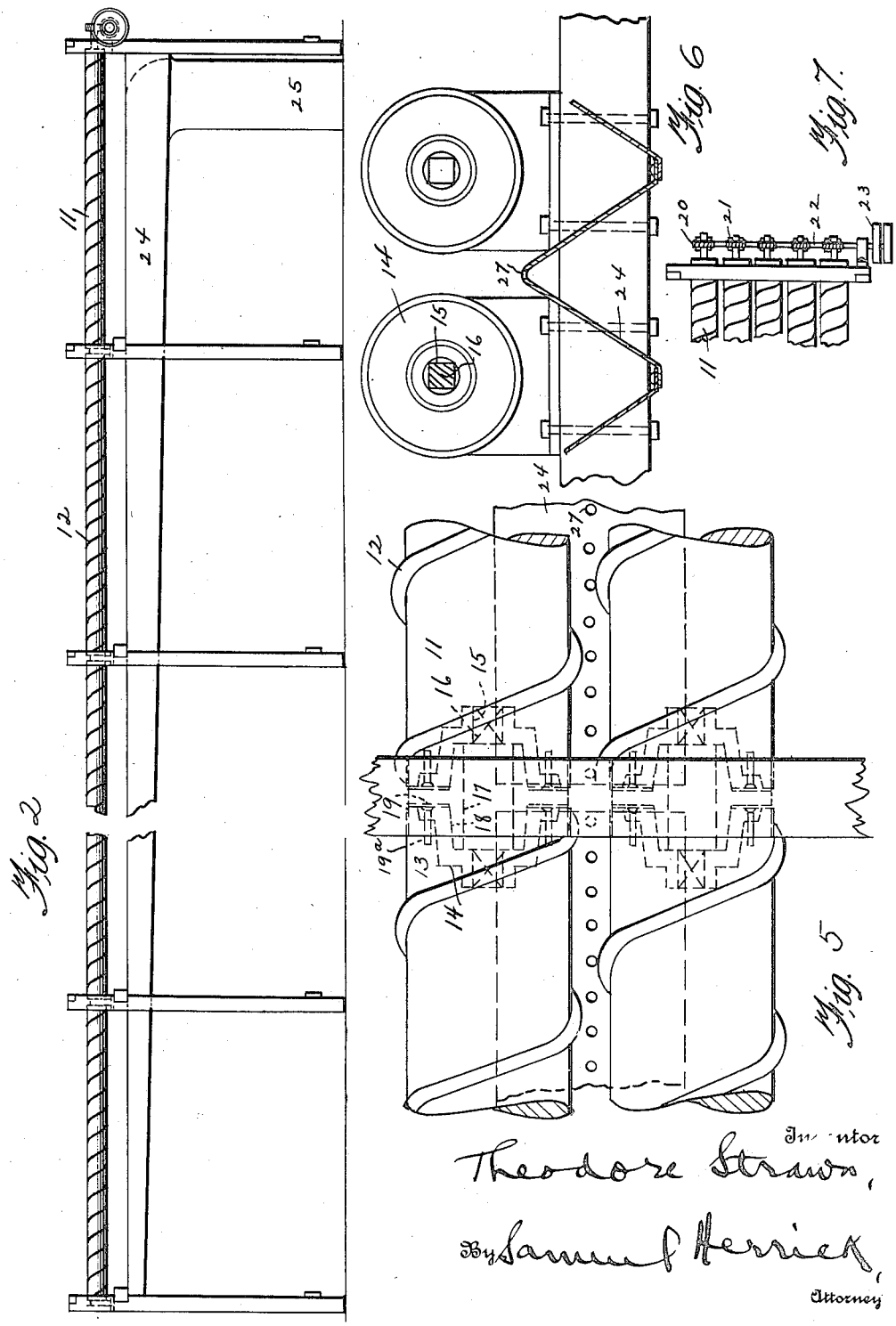

Patented Mar. 6, 1923.

1,447,494

UNITED STATES PATENT OFFICE.

THEODORE STRAWN, OF DE LAND, FLORIDA.

FRUIT-DRYING APPARATUS.

Application filed January 14, 1922. Serial No. 529,174.

*To all whom it may concern:*

Be it known that I, THEODORE STRAWN, a citizen of the United States, residing at De Land, in the county of Volusia and State of Florida, have invented certain new and useful Improvements in Fruit-Drying Apparatus, of which the following is a specification.

This invention relates to a fruit drying apparatus and it has for its object to provide an improved structure of this nature arranged to receive fruit, such as oranges for example, as they come from a washer and subject them first to a blast of cold air at high velocity to mechanically blow from the oranges the surplus water and to thereafter subject the oranges or other fruit to warm air to dry out the moisture in the pores of the fruit.

Further objects and advantages of the invention will be set forth in the detailed description which follows.

In the accompanying drawings:

Fig. 1 is a side elevation of the cold air blast mechanism and the fruit conveying means associated therewith;

Fig. 2 is a side elevation of the warm air dryer and the conveying means associated therewith;

Fig. 3 is a fragmentary sectional view through one side of the conveying apparatus of Fig. 1;

Fig. 4 is a fragmentary sectional view through the discharge portion of the blower of Fig. 1;

Fig. 5 is a partial plan view upon an enlarged scale of some of the conveying rollers of Fig. 2;

Fig. 6 is a fragmentary transverse sectional view through a pair of the rollers of Fig. 2 showing the warm air box associated with the under sides of said rollers; and Fig. 7 is a fragmentary plan view showing the driving means for the several rollers of Fig. 2.

In carrying out the invention a powerful blower 5 is arranged to discharge into a box like structure 6 having openings 7 formed in its bottom through which air at high velocity is discharged upon the fruit which is carried along beneath the box 6 by means of a conveyor 8. This conveyor preferably consists of a plurality of rollers 8ª carried by chains 9 and the under sides of these rollers engage strips 10 so that the rollers are caused to turn as they move slowly along. Thus a constant turning movement is imparted to the oranges or other fruit to expose all portions of the fruit to the action of the blast of air from the openings 7.

The roller conveyor described receives the oranges from the washer and the blasts of air discharged from the openings 7 is at such velocity that the surplus water is blown bodily from the fruit. This water is not merely dried off but, as before stated, is blown bodily from the fruit and thus the freeing of the fruit of the surplus water is accomplished with great rapidity.

From the roller conveyor shown in Fig. 1 the fruit passes to the warm air drying conveyor illustrated in Fig. 2. This consists of a plurality of hard wood rollers arranged in parallelism, as indicated at 11. Rubber strips 12 are arranged in spiral formation on the wooden rollers and act to impart longitudinal movement to the fruit while at the same time imparting a bodily turning movement to the fruit. Those rollers which are in longitudinal alinement with each other are connected end to end by means of couplings 13. These couplings consist of socket plates 14 having angular openings 15 formed therein which receive the angular ends 16 of a coupling pin 17. This coupling pin is received in a hub 18 that is provided with a flange 19, said flange projecting outwardly between the confronting faces of the sockets 14. The sockets 14 are secured to the ends of the rollers by screws 19ª.

There may be as many of the rollers 11, as desired, to make up a conveyor of the necessary width and at their ends these rollers may be provided with worm wheels 20 which mesh with worm wheels 21 upon a transverse shaft 22. Power may be applied to a pulley 23 upon this shaft for the purpose of imparting the necessary rotation to the several rollers. A hot blast box 24 which may receive hot air under pressure through a vertical flue 25 from a furnace or other source of heat (not shown) extends longitudinally beneath the rollers and has a plurality of portions of inverted V-shape along its top constituting peaks which underlie the openings between the several rollers. Openings 27 are formed along these inverted V-shaped portions 26 so that warm air is discharged upwardly through these openings and between the several rollers 11. This warm air acts to thoroughly dry out the moisture left in the pores of the fruit and this drying action is facilitated by the fact that the oranges are being given a constant turning movement as they travel along the rollers.

It is to be understood that the inventor is not limited to the precise construction set forth but that it includes within its purview whatever changes fairly come within either the terms or the spirit of the appended claims.

Having described my invention what I claim is:

1. An apparatus of the character described comprising a conveying means for fruit, an air blast apparatus arranged in conjunction with said conveying means and discharging air at such velocity as to blow surplus water bodily from the fruit.

2. An apparatus of the character described comprising a conveying means adapted to impart bodily traveling movement to the fruit and to impart turning movement to the fruit and an air blast mechanism associated with said conveyor and discharging air at such velocity upon the fruit as to bodily blow the water therefrom.

3. A mechanism of the character described comprising a conveying means for imparting a bodily traveling movement to and a rotation to fruit, an air blast mechanism associated with said conveying means and discharging cold air at such velocity as to bodily blow water from the fruit, a second conveying means receiving the fruit from the first conveying means and a warm air discharging mechanism associated with the second conveying means and discharging warm air upon the fruit.

4. In a fruit drying apparatus a conveyor consisting of a set of rollers arranged in parallelism, said rollers having spiral members thereon for imparting bodily longitudinal movement to fruit, means for imparting rotation to said rollers and a hot blast box disposed beneath said rollers the upper surface of which terminates in peaks disposed longitudinally beneath and in line with the spaces between said rollers, said peaks having a plurality of openings formed therein through which warm air is discharged upwardly between said rollers.

5. A conveying mechanism comprising a plurality of sets of rollers, each set consisting of a plurality of rollers connected together end to end and each of said rollers being provided with a member spirally arranged upon its surface, the sets of rollers being arranged in parallelism and means for rotating said rollers in unison.

In testimony whereof I affix my signature in the presence of two witnesses.

THEODORE STRAWN.

Witnesses:
 RAY H. JORDAN,
 HELEN C. WRIGHT.